Sept. 26, 1972  S. J. ANGELOVICH  3,694,267
LEAKPROOF CLOSURE SEAL FOR BATTERY
Filed Nov. 23, 1970

INVENTOR
STEPHEN J. ANGELOVICH
BY
Robert Levine
ATTORNEY

United States Patent Office 3,694,267
Patented Sept. 26, 1972

3,694,267
LEAKPROOF CLOSURE SEAL FOR BATTERY
Stephen J. Angelovich, Yonkers, N.Y., assignor to P. R.
Mallory & Co., Inc., Indianapolis, Ind.
Filed Nov. 23, 1970, Ser. No. 91,760
Int. Cl. H01m 1/02
U.S. Cl. 136—133                              10 Claims

ABSTRACT OF THE DISCLOSURE

The invention comprises the utilization of two separated plastic zones created by upper and lower layers of exudate impervious plastic materials separated by an exudate impervious adhesive backed plastic disc. An annular absorbent washer located in the lower zone traps and holds mobile liquids, vapor, gases, and fluids present in that zone while the adhesive backed plastic disc and the lower plastic layer prevent the absorbent washer from discharging any fluids outside of this zone onto the metal terminals of the battery as exudate where evaporation would create the unwanted deposits. The upper zone is established by the dual pressure clamping of the upper plastic layer between the negative terminal of the cell and an inner metal container wall and an outer metal container wall. The function of the upper zone is to electrically insulate the outer can from the negative terminal plate and to seal the cell against the inward diffusion of contaminants and against the outward creepage of electrolyte exudate.

---

This invention relates to electrochemical cells which are widely utilized in flashlights, portable radios and electronic devices, photoflashes and other devices. A common problem that has been encountered in the use of these cells is that of leakage of liquid therefrom. This problem is a particularly vexing one since such liquid leakage is corrosive and damaging to the battery itself as well as to the device in which the battery cells are used.

Battery manufacturers have adopted the following approach to the solution of this problem, which is, to encase the electrochemical cell within a closed container comprising a non-corrodable jacket surrounding the shaped housing container of the cell which may also have a top and a bottom closure means locked thereto. One type of non-corrodable jacket that has been used comprises a tube of a fibrous cellulosic material, such as "kraft" paper. This type of jacket has the advantages of being lightweight, strong, relatively inexpensive and easy to manufacture. However, the jacket is absorbent to liquid; and although it has been used as a liquid reservoir to prevent leakage within the cell, under extreme or abusive conditions of use the paper jacket may become so thoroughly saturated that it will lose its strength and ability to retain the liquid therein and to prevent its leakage from the cell as exudate.

In the copending U.S. application, Ser. No. 26,943 of Robert E. Ralston and Yung King Ko, filed on Apr. 9, 1970, and assigned to the common assignee herein, there is disclosed a multiple-walled layered tube of improved structure and method of manufacturing the same, which tube is ideally suited for use as the housing for an electrochemical cell. Broadly, this multiple-walled layered tube comprises inner and outer metal container between which is interposed the usual ply of fibrous cellulosic material, e.g., "kraft" paper. This ply constitutes a liquid permeable absorbent barrier which liquid can penetrate and become soaked into the tube, thereby destroying its ability to retain the liquid and thus allowing the liquid to escape the battery as cell exudate.

In addition to causing corrosion of the metal container and terminals of a battery, cell exudate has also given rise to other serious problems. For example, one difficult problem has been the tendency for metal formed in solution by normal consumption of the metal electrode to deposit out from the cell exudate in the form of spongy tree-like deposits. These metal deposits have formed principally between the terminals of the cell around the outside rim end of the interposed paper exposed to the atmosphere and have been particularly troublesome from the standpoint of cell performance, for these deposits very probably can short out the cell by establishing short-circuit paths between the cell electrodes. Thus the cell in many instances may be drained of its power even though it is not in use.

Accordingly, it is an object of the present invention to provide a substantially improved leak-proof electrochemical cell.

It is a further object of the present invention to prevent the establishment of short-circuit leakage paths between the electrodes of the cell by the use of a multiple plastic construction.

It is a further object of the present invention to provide a substantially improved leakproof electrochemical cell having a first leakproof zone comprising an absorbent washer, a lower layer of insulating liquid impermeable plastic, and an adhesive-backed vinyl disc.

It is a further object of the present invention to provide a second leakproof zone tandem to the first and comprised of an upper layer of insulating liquid impervious plastic contacting the adhesive-backed vinyl disc and compressed between the upper wall of an outer metal can and the pinched rim of an end terminal plate.

It is a further object of the present invention to prevent the presence of short-circuited leakage paths between the electrodes of the cell by use of two tandem zones of liquid impervious plastic each zone being double pressure sealed.

Other and further objects and advantages of the invention will become apparent from the following description, taken in conjunction with the accompanying drawing, in which.

Generally speaking, the invention comprises the utilization of two separated plastic zones created by upper and lower layers of exudate impervious plastic materials separated by an exudate impervious adhesive-backed plastic disc. An annular absorbent washer located in the lower zone traps and holds mobile liquids, vapor, gases and fluids present in that zone while the adhesive-backed plastic disc and the lower plastic layer prevent the absorbent washer from discharging any fluids outside of this zone onto the metal terminals of the battery as exudate where evaporation would create the unwanted deposits. The upper zone is established by the dual pressure clamping of the upper plastic layer between the negative terminal of the cell and an inner metal container wall and an outer metal container wall. The function of the upper zone is to electrically insulate the outer can from the negative terminal plate and to seal the cell against the inward diffusion of contaminants and against the outward creepage of electrolyte exudate.

Figure 1:
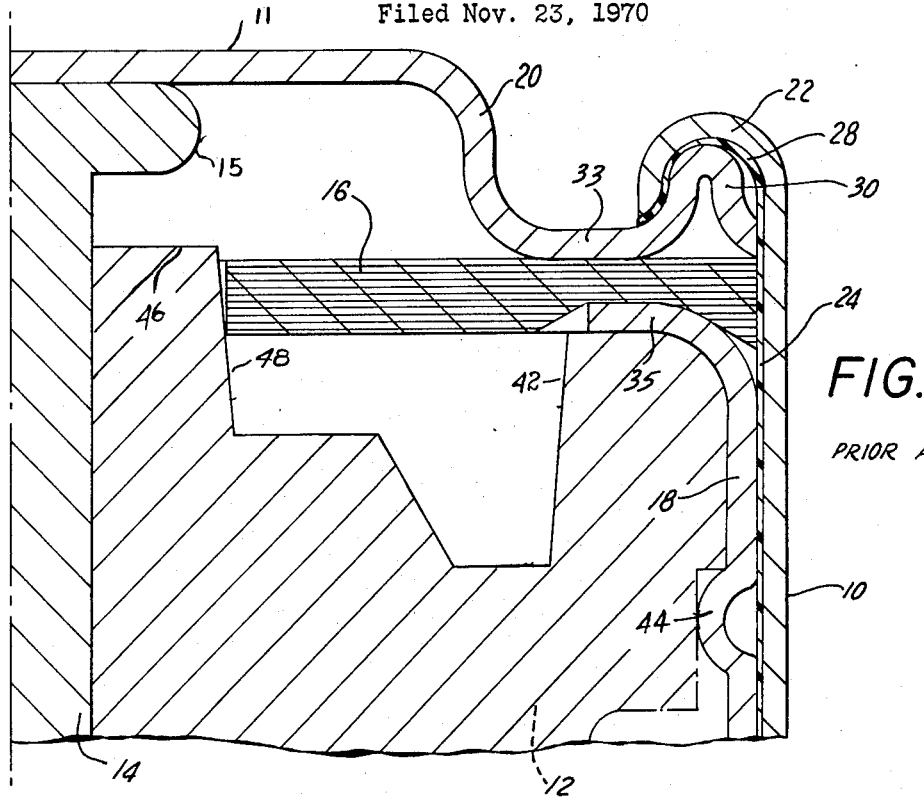
FIG. 1 is a longitudinal view of the upper portions of a previously constructed cell showing a single interposed separating layer of paper.
Figure 2:
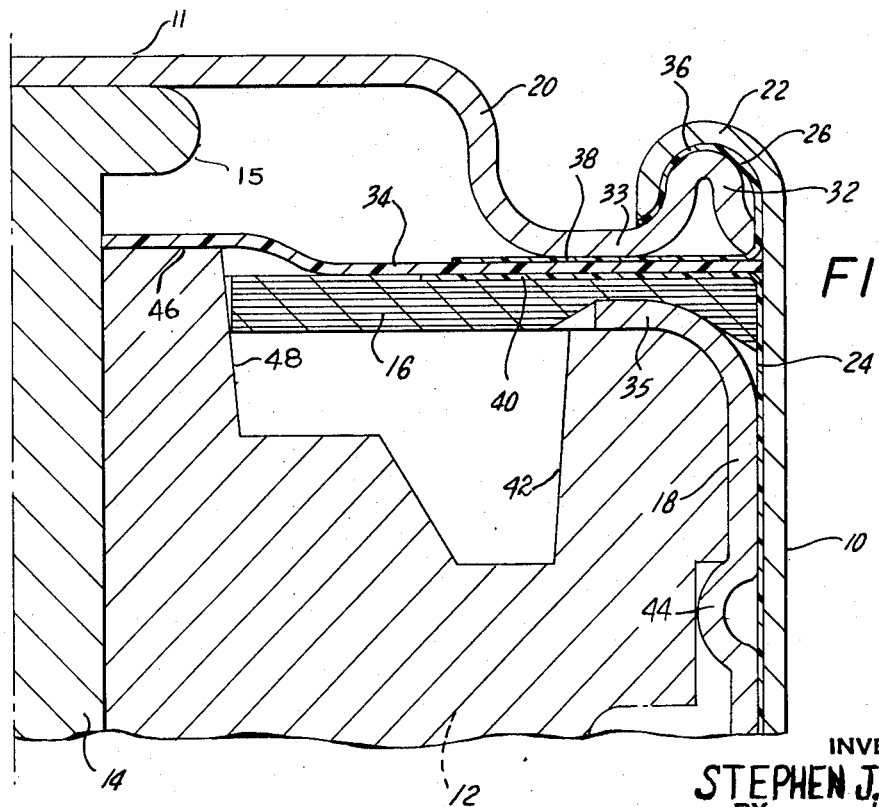
FIG. 2 is a longitudinal view of the upper portions of a cell constructed according to the present invention showing a perfected leakproof closure seal.

Referring now more particularly to FIGS. 1 and 2 of the drawing, reference numeral 10 denotes the side wall of an outer cylindrical metal container can which extends vertically along the full length of the battery from the crimped upper portion 22. The anode collector assembly which is shown and described in great detail in copending application Ser. No. 26,943, will be discussed herein only to the extent necessary to adequately disclose the present invention and its preferred embodiments. This anode collector assembly includes a nylon plastic insert cap 12 which substantially closes the upper end of the inner metal cylindrical container can 18. This cap has a central axial bore into which is tightly fitted the nail-shaped shank 14 of an anode collector element made entirely of nickel-silver, which element has a flat head 15 spaced above the top surface 46 of the plastic insert cap. In order to hold the insert cap in place in the upper portion of the cell, there is provided a shaped notched peripheral border rim 42 confined between a head constriction 44 in the wall 18 of the inner cylindrical metal can and between the flat open upper edge end 35 of the inner can.

An annular washer 16 constituted by a liquid absorbent cellulosic material, such as "kraft" paper, is set on the flat open upper edge end 35 of the inner can wall. In order to accommodate the placement of this absorbent washer, the flat open upper edge end of the inner can is bent inwardly through approximately 90 degrees to point toward the anode collector element. This flat edge end is substantially perpendicular to both the inner and the outer metal can walls and is substantially parallel to both the central circular area 11 and the annular moat ring 33 of the negative terminal plate. To lock the absorbent washer in place on the flat upper edge, the inner end of the flat upper edge 35 tapers to a point in a direction toward the anode collector element 14. Furthermore, opposite the annular moat ring there is a portion of the seated annular absorbent washer shaped in a concave downward curvature to correspondingly and securely engage the taper of said upper edge end. The washer has a central circular cut out portion being of a diameter great enough to permit the washer to fit around and to snugly contact the hub 48 of the anode collector assembly.

According to the prior art shown in FIG. 1 a single layer of an insulating material 28 such as a paper tube extends continuously from the crimped upper end 22 of the outer steel metal can downward past portion 24 surrounding the outer surface of the inner steel metal can. It has been found that by having two separate plastic layers, a lower layer 40 and an upper layer 38 separated by an adhesive-backed vinyl plastic disc 34, that two leakage-stopping zones can be created in a tandem relationship. The first lower layer 40 of insulating plastic surrounds substantially all of the inner cylindrical metal can and is folded flat to surround part of the annular washer 16. As shown in FIG. 2 the length of the lower layer 40 and the length of the upper layer 38 need not be equal. It is only required that each extend in length from the inner surface of the outer can wall radially inward past the annular moat ring 33 and the flat open upper edge end 35 of the inner can wall, so that these two plastic layers, the annular washer, and the vinyl disc can be pressure clamped between the ring 33 and the open edge 35 to create two hermetically sealed zones. The materials constituting both the upper and lower layers are high strength, flexible, liquid impermeable plastics such as polyethylene, polyvinylidene, polyvinyl chloride, polypropylene, polystyrene and mixtures thereof. Positioned between these two layers is an adhesive-backed vinyl disc 34 simultaneously engaging the lower plastic layer 40, the absorbent washer 16 and the top surface 46 of the plastic insert cap with the disc positioned between the top surface of the insert cap and the lower surface of the flat head 15 of anode collector element. Thus the adhesive-backed vinyl disc extends radially from the shank portion 14 of the anode collector element to the inner surface of the outer cylindrical metal can wall in order to establish a first leakproof zone.

The anode terminal of the battery serves a dual function in providing electrical contact to an outside circuit and in providing in combination with the flat upper end the pressure sealing necessary to establish the two leakproof zones. This preformed negative end terminal plate is made of steel and has a central circular area portion 11 with a downwardly dependent wall 20 having an annular moat ring 33 connected to an encircling pinched rim 30 in FIG. 1 and 32 in FIG. 2. The upper wall 22 of the outer can 10 is crimped downwardly over the pinched rim of the negative terminal to trap therebetween a portion 36 of the upper layer of plastic 38, so as to electrically insulate the outer can from the negative terminal plate and so as to seal the cell against the inward diffusion of contaminants and against the outward creepage of electrolyte exudate. As shown in FIG. 2 the upper layer of plastic 38 extends radially linearly and horizontally from beneath the central circular area portion of the terminal plate outwardly past the downwardly dependent wall and past the annular moat ring; then layer 38 extends in an upward arc 26 to 36 around the pinched rim 32 in a direction back toward the central area in order to establish a second leakproof zone. It is to be pointed out that in order to establish the two zone leakproof closure seal, that both of the plastic layers 38 and 40 are each subjected to a double pressure grip seal. The lower plastic layers is pressure gripped once between walls 10 and 18 and secondly between ring 33 and 35, while the upper plastic layer is pressure gripped once between ring 33 and end 35 and then secondly between crimp 22 and rim 32 with the applied pressure being maximum against portion 36 to prevent the ingress of contaminants and the egress of exudate due to shifting of the negative terminal plate from mishandling of the cell during shipping, installation, etc.

The flat head 15 of the anode collector element prior to assembling the cell is welded to the central portion 11 of the negative terminal plate which serves as a handle for manipulating this element. In the process of assembling together the component parts of the cell, annular rings of a positive cathode depolarizer material are comprised of manganese dioxide, mercuric oxide, or a combination of both, intermixed with a suitable inert and electronically conductive filler material such as graphite. One or more annular self-supporting depolarizer rings are pressed from a mixture of 91% by weight electrolytic manganese dioxide and 9% by weight of graphite although other proportions can be used, for example 5% to 20% graphite. The dimensions of the pressed depolarizer are such that tight fit and good electrical contact is made with the inner surface of the side wall and the closed bottom surface of the inner metal can. The negative anodic electrode is made of amalgamated zinc powder which is sufficiently pressed to permit the insertion of anode collector element 14. The diameter of the anodic electrode is such that it may be placed within the cathode and spaced sufficiently therefrom.

An absorbent separator material such as dexter paper and/or parchment paper is disposed within the cathode and this separator comprises a concentrically fitted electrically insulating porous lining, the center of which defines a central chamber into which is inserted the anode electrode, as shown and described in copending application Ser. No. 26,943. This absorbent separator lining maintains the presence of a suitable electrolyte such as 35–40% KOH, 3.5–6.5% ZnO, the balance water, in contact with the electrodes while providing a suitable ionically permeable barrier material. After inserting the anode electrode into the central chamber, the plastic insert cap 12 is positioned within the inner metal can with the peripheral border rim 42 resting upon bead constriction 44 in wall 18, this bead having been formed by metal working wall 18 after the cathode rings had been inserted thereinto the inner metal can.

After the nylon plastic disc 12 is seated on bead 44, the open upper edge end 35 of the inner can is bent inwardly to confine the peripheral border rim 42 and to form a compression seal within. Annular absorbent washer 16 is seated on the flat open upper edge end 35 with the hub 48 projecting above the washer and snugly contacting the washer. A lower layer of plastic tubing 40 is shrunk on over the absorbent washer and over the outer wall of the inner metal can. An adhesive-backed vinyl disc 34 blanked from electrical tape is pressed onto the lower plastic layer, the absorbent washer 16, and the hub 48 with the adhesive surface in direct contact with hub surface 46. Since the shrinkable tubing 40 may be polyvinyl chloride, PVC, the adhesion between the disc and the PVC tubing is excellent in a caustic media. Alternatively the tape layer 46 may be laminated to the absorbent washer 16 before the washer is inserted onto the upper edge 35. The concept of shrinking the PVC plastic refers to stretch pressing the plastic around another structure of greater diameter such that the elastic nature of the plastic will establish an impermeable seal.

The upper layer of plastic 38 is then laid on top of disc 34. At this point the shank 14 of the nail-shaped anode collector element is inserted into the central axial bore of the insert cap 12 and forced into the anodic electrode to make contact therewith. The pre-formed negative end terminal plate being welded to the flat head 15 is used to manipulate the collector element during this insertion. Finally, the annular moat ring 33 will rest upon the upper surface of the upper plastic layer 38, which layer is placed in tension by extension of portion 38 radially linearly from beneath the moat ring outwardly past the pinched rim 32 and then by extending it in an upward arc to point 26 where the rim is again contacted. The upper layer is then folded around the pinched rim in a direction back toward the central area 11, with extra material being utilized to maintain the tensile forces while the outer metal can 10 is slipped over the upper and the lower plastic layers and then while the upper end 22 of tube 10 is crimped downwardly over the pinched rim of the negative terminal to trap therebetween a portion of the negative end terminal plate. This crimp of end 22 over rim 32 not only holds portion 36 in a compression grip but also holds elements 38, 34, 40, and 16 in a compression grip between ring 33 and end 35 to create respectively the upper and lower leakproof sealing zones.

When a group of test cells were constructed according to the invention as described above and were subjected to a temperature cycling test used for accelerating leakage, these cells went 40–80 days with no leakage evident on the exterior of the battery. Batteries constructed according to the prior art lasted a maximum of four days before leakage appeared. From these comparative test results, the great superiority of the cells of this invention over conventional cells becomes clearly apparent.

Although the present invention has been discolsed in connection with a few preferred embodiments thereof, variations and modifications may be resorted to by those skilled in the art without departing from the principle of the invention. All of these variations and modifications are considered to be within the true spirit and scope of the present invention, as disclosed in the foregoing description and defined by the appended claims.

What is claimed is:

1. In a battery comprising an inner cylindrical metal can; an anode; a cathode; an electrolyte therebetween; an anode collector assembly, having a plastic insert cap substantially closing the upper end of said can; a negative terminal end plate, having an annular moat ring connected to an encircling pinched rim; and an outer cylindrical metal can; a closure sealing means therefor comprising annular absorbent washer seated on a flat open upper edge end of the inner metal can; a first lower layer of insulating liquid-impermeable plastic surrounding substantially all of the inner cylindrical metal can outer wall and part of the annular washer; an adhesive-backed plastic disc simultaneously engaging the lower plastic layer, the absorbent washer, and the top surface of said plastic insert cap in order to establish a first leakproof zone; a second upper layer of insulating liquid-impermeable plastic in contact with the upper surface of said adhesive-backed plastic disc; the upper inside wall of said outer can which is crimped downwardly over the pinched rim of said negative end terminal plate to trap therebetween a portion of said upper layer of plastic, so as to establish a second leakproof zone, and to provide, in combination with the flat open upper edge end of the inner can wall, and the annular moat ring, the gripping means necessary to clamp therebetween the two plastic layers, the annular washer, and the plastic disc to create two hermetically sealed zones.

2. In a battery comprising an inner cylindrical metal can closed at its bottom end and open at its top end; electrical energy producing components contained within said can comprising an anode and a cathode separated by an ionic exchange membrane separator carrying an electrolyte; an anode collector assembly having a plastic insert cap substantially closing the upper end of said can; a preformed negative end terminal plate having a central circular area portion with a downwardly dependent wall having an annular moat ring connected to an encircling pinched rim, wherein said end plate is seated on the top surface of an upper layer of insulating impermeable plastic; and an outer cylindrical metal can externally surrounding both a lower plastic layer and an upper plastic layer; a closure sealing means therefor comprising an annular absorbent washer seated on a flat open upper edge end of the inner meta can; a first lower layer of insulating liquid-impermeable plastic surrounding substantially all of the inner cylindrical metal can outer wall and part of the annular washer; an adhesive-backed plastic disc simultaneously engaging the lower plastic layer, the absorbent washer, and the top surface of said plastic insert cap in order to establish a first leakproof zone; a second upper layer of insulating liquid-impermeable plastic in contact with the upper surface of said adhesive-backed plastic disc; the upper wall of said outer can which is crimped downwardly over the pinched rim of said negative end terminal plate to trap therebetween a portion of said upper layer of plastic, so as to establish a second leakproof zone, and to provide, in combination with the flat open upper edge end of the inner can wall, and the annular moat ring, the gripping means necessary to clamp therebetween the two plastic layers, the annular washer, and the plastic disc to create two hermetically sealed leakproof zones.

3. In a battery comprising an inner cylindrical metal can closed at its bottom end and open at its top end; electrical energy producing components contained within said can comprising an anode and a cathode separated by an ionic exchange membrane separator carrying an electrolyte; an anode collector assembly having a plastic insert cap substantially closing the upper and of said can; a preformed negative end terminal plate having a central circular area portion with a downwardly dependent wall having an annular moat ring connected to an encircling pinched rim, wherein said end plate is seated on the top surface of an upper layer of insulating impermeable plastic; and an outer cylindrical metal can externally surrounding both a lower plastic layer and an upper plastic layer, wherein said plastic layers consist of polyvinyl chloride; a closure sealing means therefor comprising an annular absorbent washer seated on a flat open upper edge end of the inner metal can; a first lower layer of insulating liquid-impermeable plastic surrounding substantially all of the inner cylindrical metal can outer wall and part of the annular washer; an adhesive-backed plastic disc simultaneously engaging the lower plastic layer, the absorbent washer and the top surface of said plastic insert cap in order to establish a first leakproof zone; a second upper layer of insulating liquid-impermeable plastic in contact with the upper surface of said adhesive-backed plastic disc; the upper wall of said outer can which is crimped downwardly over the pinched rim of said negative end terminal plate to trap therebetween a portion of said upper layer of plastic, so as to establish a second leakproof zone, and to provide, in combination with the flat open upper edge end of the inner can wall, and the annular moat ring, the gripping means necessary to clamp therebetween the two plastic layers, the annular washer, and the plastic disc to create two hermetically sealed leakproof zones.

4. An electrochemical cell comprising an inner cylindrical metal can closed at its bottom end and open at its top end; electrical energy producing components contained within said can comprising an anode and a cathode separated by an ionic exchange membrane separator carrying an electrolyte; an anode collector assembly comprising a plastic insert cap substantially closing the upper end of said can and having a peripheral border rim and also having a central axial bore into which is tightly fitted the nail-shaped shank of an anode collector element having a flat head spaced above said plastic insert cap; said plastic insert cap held in place by said peripheral border rim confined between a bead constriction in the wall of said inner cylindrical metal can and a flat open upper end of the inner can; an annular absorbent washer seated on the flat open upper edge end of the inner can; a first lower layer of insulating liquid impermeable plastic surrounding substantially all of the inner cylindrical metal can outer wall and part of the annular washer; an adhesive-backed plastic disc simultaneously engaging the lower plastic layer, the absorbent washer, and the top surface of said plastic insert cap, said disc positioned between the top surface of said plastic insert cap and the flat head of said anode collector element; a second upper layer of insulating impermeable plastic in contact with the upper surface of said adhesive-backed plastic disc; a pre-formed negative end terminal plate having a central circular area portion with a downwardly dependent wall having an annular moat ring connected to an encircling pinched rim, said end plate seated on the top surface of said upper layer of plastic; an outer cylindrical metal can externally surrounding both the lower plastic layer and the upper plastic layer, the upper wall of said outer can being crimped downwardly over the pinched rim of said negative end terminal plate to trap therebetween a portion of said upper layer of plastic, so as to electrically insulate said outer can from said negative terminal plate and to provide, in combination with the flat open upper edge end of the inner can wall and the annular moat ring, the gripping means necessary to clamp therebetween the two plastic layers, the annular washer, and the plastic disc to create two hermetically sealed zones so as to seal the cell against the inward diffusion of contaminants and against the outward creepage of electrolyte.

5. The electrochemical cell claimed in claim 4 wherein the negative terminal plate comprises a central circular area portion with a downwardly dependent wall having an annular moat ring connected to an encircling pinched rim; wherein the plastic insert cap is comprised of nylon; wherein the upper and lower plastic layers each is comprised of polyvinyl chloride; and wherein the plastic disc is comprised of vinyl.

6. The electrochemical cell claimed in claim 5 wherein the flat head of said anode collector element is welded to the central portion of the negative terminal plate which serves as a handle for manipulating said element.

7. The electrochemical cell claimed in claim 6 wherein said adhesive-backed plastic disc extends radially from the shank portion of the anode collector element to the inner surface of the outer cylindrical metal can wall, and where said plastic disc simultaneously engages the absorbent washer, the top surface of the plastic insert cap, and a first lower layer of insulating liquid impermeable plastic surrounding substantially all of the inner cylindrical metal can outer wall and part of the annular washer, in order to establish a first leakproof zone.

8. The electrochemical cell claimed in claim 7 wherein the upper layer of insulating plastic extends radially linearly from beneath the central circular area portion of said terminal plate outwardly past the downwardly dependent wall and past the annular moat ring and then extends in an upward arc around the pinched rim in a direction back toward said central area in order to establish a second leak proof zone.

9. The electrochemical cell claimed in claim 8 wherein the flat open upper edge end of the inner can is bent inwardly through approximately 90° to point toward the anode collector element, said flat edge end being substantially perpendicular to both the inner and the outer metal can walls and being substantially parallel to both the central circular area and the annular moat ring of the negative terminal plate.

10. The electrochemical cell claimed in claim 9 wherein the flat open upper edge end of the inner can tapers in a direction toward the anode collector element, and wherein a portion of the seated annular absorbent washer adjacent the annular moat ring has a concave downward curvature to correspondingly engage the taper of said upper edge end.

References Cited

UNITED STATES PATENTS

| | | | |
|---|---|---|---|
| 2,849,521 | 8/1958 | Heise et al. | 136—133 |
| 2,850,557 | 9/1958 | Kirk et al. | 136—133 |

WINSTON A. DOUGLAS, Primary Examiner

H. A. FEELEY, Assistant Examiner